June 15, 1965 W. L. DRAYER 3,189,280
VIBRATORY ATOMIZER
Filed Dec. 14, 1961

INVENTOR.
William L. Drayer
BY
Paul J. Reising
ATTORNEY

United States Patent Office 3,189,280
Patented June 15, 1965

3,189,280
VIBRATORY ATOMIZER
William L. Drayer, Warren, Mich., assignor to General Motors Corporation, Detroit, Mich., a corporation of Delaware
Filed Dec. 14, 1961, Ser. No. 159,313
5 Claims. (Cl. 239—4)

This invention concerns an atomizer and more particularly an apparatus and method in which vibratory energy is utilized for flexing a diaphragm and thereby atomizing liquid therefrom.

Vibrating a diaphragm or disk type member to achieve atomization of a liquid is not new, however, in the past atomizers of this sort have been found to lack durability and be expensive to manufacture due to the complex and delicate means utilized for creating the vibratory energy.

Accordingly, one object of this invention is to provide a diaphragm type atomizer that is simple in structure, efficient in operation, and inexpensive to manufacture.

Another object of this invention is to provide a diaphragm type atomizer that is associated with a vibrator in a manner that provides a high frequency rotating flexing action of the diaphragm so that liquid on the diaphragm surface is mechanically atomized into fine liquid particles.

The above and other objects are accomplished with an atomizer having a housing that peripherally supports a diaphragm or disk member. A rod or shaft is connected at one end to the disk member and has the other end extending into operative association with a fluid driven vibrator. The vibrator includes a rotor that is associated with the free end of the shaft and is adapted to be driven in an orbital path so as to generate a rotating force impulse which is transmitted through the shaft to the diaphragm, resulting in a rotating wave type action that serves to atomize liquid from the surface of the diaphragm.

A more complete understanding of the subject invention may be derived from a perusal of a detailed description taken in conjunction with the drawings, in which.

Figure 1:
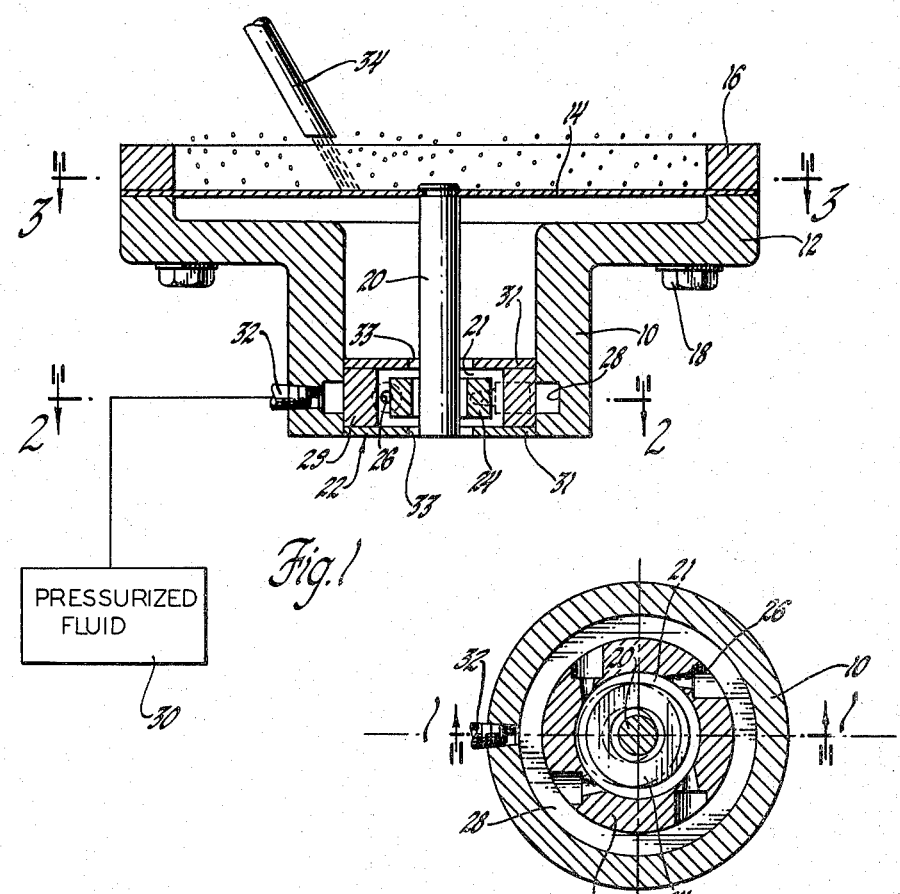
FIGURE 1 shows an elevation view in section of the subject invention.

Referring now to the drawings, FIGURE 1 shows the preferred embodiment of the subject invention comprising an inverted hat-shaped housing having a base portion 10 and a radially extending flange portion 12. A disk-shaped diaphragm 14 is rigidly secured to the housing at portions adjacent the periphery of the diaphragm by a ring member 16 which is mounted to the flange portion 12 of the housing by a plurality of fasteners, one of which is shown at 18. An elongated shaft or rod 20 is mounted at one end to the center portion of the diaphragm and includes a free end that is incorporated with a vibrator generally indicated by the numeral 22.

Figure 2:
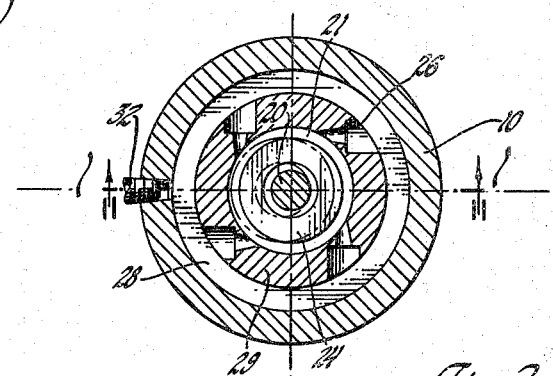
FIGURE 2 is a section taken on lines 2—2 of FIGURE 1.
Figure 3:
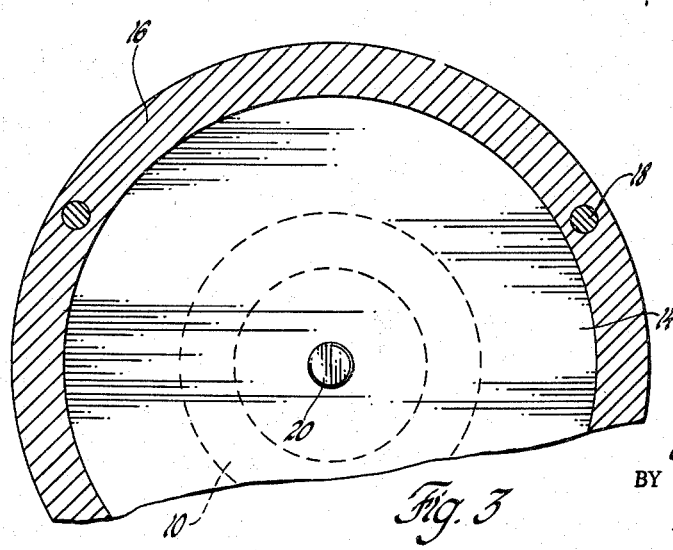
FIGURE 3 is a partial section taken on lines 3—3 of FIGURE 1.

As best seen in FIGURE 2, the vibrator 22 includes a ring type rotor 24 that is freely mounted on the shaft 20 and is adapted to move in an orbital path within a fluid chamber 21 in a manner as will hereinafter be described. A plurality of circumferentially spaced nozzles 26 are formed in an annulus 29 and connected with an annular passage 28 which in turn, communicates with a source of pressurized fluid 30 via the conduit 32. The annulus 29 is bounded at the sides thereof by a pair of washer type members 31, each of which are provided with enlarged apertures 33 to permit orbital movement of the shaft 20 without interference. It should be noted that the axis of each nozzle 26 is parallel to and offset from one of the mutually perpendicular center lines shown in FIGURE 2 so that the stream of fluid emanating from each of the nozzles impinges against the peripheral surface of the rotor at a tangential attitude.

During operation, liquid that is to be atomized is supplied to the surface of the diaphragm through a conduit 34 which, as shown in FIGURE 1, can be disposed adjacent to the diaphragm and spaced in a vertical direction therefrom. Simultaneously, the vibrator 22 is energized by directing pressurized fluid from the source 30 to the annular passage 28 wherefrom the fluid flows into the several nozzles 26 around the chamber 21. The fluid leaves the nozzles in the form of a high velocity stream impinging against the peripheral surface of the rotor 24 and driving the rotor in a hula-hoop manner about the shaft 20. As the rotor orbits about the shaft, a centrifugal force acts against the surface of the shaft in the form of a rotating force vector with the frequency of the force impulse being determined by the respective diameters of the shaft and the rotor opening. As shown in FIGURE 1, the diameter of the shaft is greater than half the diameter of the opening formed in the rotor. In this manner, for each complete revolution of the rotor, a number of impulses greater than one is generated against the surface of the shaft and, by properly dimensioning the respective diameters of the shaft and rotor opening, the frequency of the force impulses generated may be controlled. This principle is explained in a patent to Svenson 2,194,410 and reference is made thereto for a more complete understanding of this feature.

As the rotor orbits about the shaft 20, the rotating force impulses are transmitted through the shaft to the diaphragm 14 by the orbital movement of the shaft end connected to the diaphragm. The latter movement results in the diaphragm having a rotating wave type action that serves to vehemently agitate the liquid supplied to the diaphragm surface resulting in the liquid being broken-up and thrown in a substantially vertical direction from the diaphragm in the form of a mist.

Various changes and modifications can be made in this atomizer without departing from the spirit of the invention. It should be understood that these changes and modifications are contemplated and I do not wish to be limited except by the scope of the appended claims.

What is claimed is:

1. In a method for atomizing liquid from the surface of a disk type member having a rod centrally extending therefrom comprising the step of constraining the peripheral edge of said disk member, supplying liquid to said surface of said member, driving a mass in an orbital path, and coupling said driven mass to the free end of the rod so as to create gyratory type movement of said rod with resultant rotating flexing movement of the disk member about an axis substantially perpendicular to the plane of said disk member whereby liquid deposited on said surface is mechanically atomized.

2. In a method for atomizing liquid from the surface of a disk type member comprising the steps of constraining the peripheral edge of said disk member, supplying liquid to said surface of said member, driving a mass in an orbital path, and coupling said driven mass to the disk member so as to create a rotating flexing movement of the disk member about an axis substantially perpendicular to the plane of said disk member whereby liquid deposited on said surface is mechanically atomized.

3. In a method for atomizing liquid from the surface of a disk-type member having a rod centrally extending therefrom, comprising the steps of constraining the peripheral edge of said disk member, supplying liquid to said surface of said member, and generating sufficient gyratory movement in said rod to cause a rotating wavetype motion of said disk member about the axis of the rod so that the liquid deposited on said surface is atomized.

4. An atomizer comprising, a housing, a diaphragm secured at the periphery thereof to said housing, a rod connected at one end to the center of the diaphragm and extending therefrom along an axis substantially perpendicular thereto, a vibrator having a mass adapted to be driven in an orbital path so as to generate a rotating force vector, said vibrator mounted in said housing and coupled to the other end of said rod so that said rotating force vector acts in a plane transverse to the longitudinal axis of the rod and thereby generates a gyratory movement of said rod to create a rotating wave in said diaphragm, and means for supplying a liquid to the diaphragm to be atomized by said rotating wave.

5. An atomizer comprising a housing, a diaphragm secured at the periphery thereof to said housing, a rod connected at one end to the center of the diaphragm and extending along an axis substantially perpendicular thereto, an annular chamber formed in said housing and having the other end of the rod disposed therein, a ring-type mass in said chamber and mounted on said other end of the rod for orbital movement thereabout, said mass having an inner diameter greater than the outer diameter of the rod, means for driving said mass about said rod in an orbital path to generate a gyratory movement of said rod and thereby create a rotating wave in said diaphragm, and means for supplying a liquid to the diaphragm so as to be atomized by said rotating wave motion.

References Cited by the Examiner
UNITED STATES PATENTS

| | | | |
|---|---|---|---|
| 2,194,410 | 3/40 | Svenson | 259—1 |
| 2,779,623 | 1/57 | Eisenkraft | 239—4 |
| 2,812,612 | 11/57 | Vang | 239—102 |
| 2,908,443 | 10/59 | Fruengel | 239—4 |
| 2,960,314 | 11/60 | Bodine | 257—73 |
| 3,034,728 | 5/62 | Hruby | 239—240 |

EVERETT W. KIRBY, *Primary Examiner.*

MEYER PERLIN, LOUIS J. DEMBO, *Examiners.*